United States Patent [19]

Senatore

[11] 4,371,635

[45] Feb. 1, 1983

[54] FILLED HIGH VINYL POLYBUTADIENE THERMOSETTING COMPOSITIONS CONTAINING A MALEIC ANHYDRIDE-POLYBUTADIENE ADDUCT

[75] Inventor: Guy Senatore, Bartlesville, Okla.

[73] Assignee: Phillips Petroleum Company, Bartlesville, Okla.

[21] Appl. No.: 357,119

[22] Filed: Mar. 11, 1982

[51] Int. Cl.³ .................... C08K 3/40; C08K 3/22; C08K 5/14

[52] U.S. Cl. .................... 523/219; 524/394; 524/399; 524/400; 524/425; 524/426; 524/432; 524/433; 524/434; 524/436; 524/437; 524/444; 524/445; 524/449; 524/451; 524/504; 524/517; 525/74

[58] Field of Search .............. 525/74; 524/504, 432, 524/433, 434, 436, 444, 445, 449, 451, 426, 399, 400, 425, 437, 394, 517; 523/219

[56] References Cited

U.S. PATENT DOCUMENTS

| | | | |
|---|---|---|---|
| 3,636,141 | 1/1972 | O'Neill et al. | 525/193 |
| 3,816,235 | 6/1974 | Lin | 428/392 |
| 3,821,158 | 6/1974 | Westermann et al. | 524/523 |
| 3,852,225 | 12/1974 | Ishikawa et al. | 523/215 |
| 3,926,873 | 12/1975 | Aishima et al. | 525/36 |
| 3,928,270 | 12/1975 | South | 524/321 |
| 3,952,023 | 4/1976 | Kaiya et al., | 549/255 |
| 4,020,054 | 4/1977 | Fodor | 524/399 |
| 4,082,817 | 4/1978 | Imaizumi et al. | 525/285 |
| 4,107,134 | 8/1978 | Dawans | 524/49 X |
| 4,108,947 | 8/1978 | Kimura et al. | 525/97 |
| 4,218,349 | 8/1980 | Minatono et al. | 524/517 |
| 4,318,960 | 3/1982 | McCombs et al. | 428/392 |

OTHER PUBLICATIONS

Chem. Abs. 88-137366 (1978) Takaishi et al. (J77133349).
Chem. Abs. 88-137367 (1978) Takaishi et al. (J77133352).
Chem. Abs. 83-61515 (1975) Lin (DE 2,341,474).
Derwent Abst. 85280 B/47 (J54133540) Oct. 1979.
Derwent Abst. 55344 B/30 (J54074893) Jun. 1979.

*Primary Examiner*—Wilbert J. Briggs, Sr.
*Assistant Examiner*—Herbert J. Lilling

[57] ABSTRACT

In a thermosetting composition containing high vinyl alkadiene polymer, organic peroxide, calcium carbonate filler and optional ingredients comprising a vinyl arene liquid monomer, coupling agent, polymerizable plasticizer, and fiberglass reinforcing filler, the addition of an adduct of polybutadiene and a carboxylic acid anhydride improves properties of the molded compositions comprising flexural modulus, tensile strength and Barcol hardness.

23 Claims, No Drawings

4,371,635

FILLED HIGH VINYL POLYBUTADIENE THERMOSETTING COMPOSITIONS CONTAINING A MALEIC ANHYDRIDE-POLYBUTADIENE ADDUCT

Various compositions useful for thermosetting molding have been described in the art. U.S. Pat. No. 3,821,158, for example, describes a high vinyl polybutadiene-based composition which is used in conjunction with low density polyethylene. Another molding composition based on 1,2-polybutadiene, as described in U.S. Pat. No. 3,636,141, comprises a vinyl monomer such as styrene. U.S. Pat. No. 3,821,158 teaches the preparation of thermosetting compositions comprising high vinyl polybutadiene, a vinyl arene comonomer and fillers such as glass fibers and calcium carbonate. U.S. Pat. No. 3,926,873 discloses molding compositions comprising a thermoplastic material such as butadiene rubber, an unsaturated carboxylic acid such as maleic acid, and inorganic fillers. U.S. Pat. Nos. 4,082,817 and 3,952,023 disclose the preparation of adducts of maleic anhydride and high vinyl polybutadiene for use in adhesives and paints, but do not disclose the use of such adducts in bulk molding thermosetting compositions. The present invention relates to thermosetting molding compositions based on filled high vinyl alkadiene polymers, and the improvement in physical properties produced by the inclusion of the adduct of an alkadiene polymer with an anhydride of a mono or dicarboxylic acid.

SUMMARY OF THE INVENTION

Alkadiene polymers and copolymers containing more than about 50 percent of the 1,2-bonded units as defined in this specification as high vinyl alkadiene polymers and can be made, for example, by alkali metal catalyzed polymerization. High vinyl alkadiene polymers are known to have useful thermosetting properties.

By thermosetting molding composition is meant throughout this specification a composition which can be fabricated into hard infusible shaped articles by the action of heat and pressure, for example by pressing in a heated mold. Examples of such thermosetting molding compositions are reinforced or unreinforced compositions, preimpregnated mats or other forms of reinforcement in preimpregnated form and preformed molding compositions.

Thermosetting compositions based on such ingredients as high vinyl butadiene polymers and styrene can be employed as bulk molding compositions (BMC), sheet molding compositions (SMC) and thick molding compositions (TMC®). Thorough mixing of the components of such thermoset formulations requires initially low viscosities to ensure attainment of the desired degree of uniformity and good glass fiber wet-out without attrition. For some applications, following mixing, the formulations should thicken rapidly and retain reasonably constant viscosities over their expected shelf lives to be useful in molding applications. Thickening of many conventional thermoset formulations can be accomplished by adding oxides or hydroxides of the alkaline earth metals, such as magnesium hydroxide.

It is an object of this invention to provide new thermosetting compositions based on alkadiene polymers. It is another object of this invention to provide alkadiene polymer-based thermosetting compositions comprising a minor amount of an adduct of an alkadiene polymer with an anhydride of a mono- or dicarboxylic acid. It is still another object of this invention to provide alkadiene polymer-based thermosetting compositions having improved flexural properties and hardness.

These and other objects, advantages, details, features and embodiments of this invention will become apparent to those skilled in the art from the following detailed description of the invention, the appended claims, and examples including descriptions of the preparation of the inventive compositions and their properties when molded.

In accordance with this invention, thermosetting compositions are provided comprising (a) a high-vinyl alkadiene polymer, (b) an adduct of an alkadiene polymer with an anhydride of a mono- or dicarboxylic acid, (c) an organic peroxide, (d) reinforcing fillers, (e) optionally, unsaturated vinyl arene monomer, polymerizable plasticizer, coupling agent(s), polar liquids such as water, and thickening agents comprising magnesium hydroxide, magnesium oxide, and mixtures thereof. It has been discovered that said compositions have higher flexural and tensile properties and greater hardness than compositions without the polymer-anhydride adduct.

These advantageous properties make the compositions of this invention useful as sheet molding, bulk molding or thick molding compounds, especially for bulk molding. The compositions thus can be used in thermoset molding processes by, e.g., compression, injection, or transfer, to produce such articles as machine housings, electrical switch boxes, automotive parts or the like.

Alkadiene Polymers

The alkadiene polymers used in preparing the thermosetting compositions of this invention can be linear or radially branched homopolymers of conjugated alkadienes containing 4–8 carbon atoms such as 1,3-butadiene, isoprene, 2-ethyl-1,3-butadiene, chloroprene and the like, and mixtures thereof. Also linear or radially branched copolymers of conjugated alkadienes containing 4–18 carbon atoms with vinyl arene comonomers containing 8–20 carbon atoms, such as styrene, alpha-methylstyrene, 3,5-diethylstyrene, 4-n-propylstyrene, 4-cyclohexylstyrene, 4-phenylstyrene, 3-benzylstyrene, 2,4,6-trimethylstyrene, 1-vinylnaphthalene, 8-phenyl-1-vinyl-naphthalene and the like can be employed.

The presently preferred alkadiene polymer is a linear homopolymer of 1,3-butadiene.

The above-cited alkadiene homo- and copolymers suitable for this invention have a number average molecular weight ($M_n$) ranging from about 500 to about 500,000, more preferably from 1,000 to 50,000. The vinyl content, i.e., the proportion of alkadiene units bonded together in the 1,2-mode of addition, thus forming vinyl pendant groups, preferably ranges from about 50 percent to about 100 percent, more preferably from about 60 percent to 100 percent (as quantitatively determined by infrared absorption spectroscopy at 11.0 micron, using a solution of approximately 2.5 grams of polymer in 100 milliliters of anhydrous carbon disulfide).

Polymer-Anhydride Adducts

The adducts of an alkadiene polymer and an anhydride of a mono- or dicarboxylic acid employed in this invention can be formed by the reaction of the conjugated alkadiene homo- and block copolymers (similar to those described earlier) and acid anhydrides such as maleic anhydride, citraconic anhydride, or alkylmaleic anhydrides (the alkyl group having 1-12 carbon atoms), e.g., n-dodecylmaleic anhydride, itaconic anhydride and further examples described in U.S. Pat. Nos. 3,952,023, and 4,082,817. The anhydrides of dicarboxylic acids are generally preferred.

The alkadiene polymers used in preparing the adducts of this invention can be linear or radially branched homopolymers of conjugated alkadienes containing 4-8 carbon atoms such as 1,3-butadiene, isoprene, 2-ethyl-1,3-butadiene, chloroprene and the like, and mixtures thereof. Also linear or radially branched copolymers of conjugated alkadienes containing 4-18 carbon atoms with vinyl arene comonomers containing 8-20 carbon atoms, such as styrene, alpha-methylstyrene, and the like can be employed. The presently preferred alkadiene polymer is a linear homopolymer of 1,3-butadiene. The above-cited alkadiene homo- and copolymers suitable for adducts of this invention have a number average molecular weight Mn ranging from about 500 to about 500,000, more preferably from 1,000 to 50,000. Although these polymers need not contain vinyl units, the vinyl content, i.e., the proportion of alkadiene units bonded together in the 1,2-mode of addition, thus forming vinyl pendant groups, preferably is at least about 20 percent.

The presently preferred adduct of an alkadiene polymer and an acid anhydride is one containing about 80 parts by weight of a low molecular weight 1,3-butadiene homopolymer (number molecular weight Mn of about 1,000-2,000) and about 20 parts by weight of maleic anhydride, said adduct having a vinyl content before reaction (as determined by infrared absorption spectroscopy at 11.0 microns) ranging from about 20 percent to about 95 percent, most preferably from about 30 percent to 50 percent.

Organic Peroxide

The thermosetting compositions of this invention include free radical initiator, preferably an organic peroxide compound, as a curing or crosslinking agent for the alkadiene polymer segments. Suitable peroxy compounds include diacyl peroxides, ketone peroxides, peroxydicarbonates, peroxyesters, dialkyl peroxides, hydroperoxides, and peroxyketals, preferably containing up to about 30 carbon atoms per molecule. Exemplary organic peroxy compounds include alpha,alpha'-bis(tert-butylperoxy)diisopropylbenzene;
2,5-dimethyl-2,5-bis(tert-butylperoxy)hexane,
n-butyl-4,4-bis(tert-butylperoxy)valerate;
1,1-di(tert-butylperoxy)-3,3,5-trimethylcyclohexane,
and admixtures thereof. These organic peroxides are effective in crosslinking the composition when the composition is heated beyond the activation temperature, i.e., decomposition temperature, of said peroxides. A free radical initiator of alpha,alpha'-bis(tert-butylperoxy)diisopropylbenzene is most preferred.

Liquid Monomer

The liquid monomers preferably used in the composition of the invention claimed are vinyl arenes containing from 8 to 18 carbon atoms; alpha, beta-unsaturated esters having 4 to 16 carbon atoms, and vinyl and allyl esters containing from 6 to 18 carbon atoms. Examples of such vinyl arenes are styrene, alpha-methylstyrene, 4-methylstyrene, 4-tert-butylstyrene, 4-cyclohexylstyrene, 1-vinylnaphthalene, 1,3-divinylbenzene, and the like. Examples of such vinyl and allyl esters are divinyl phthalate, diallyl phthalate, diallyl-4-methyl-phthalate, and the like. Presently it is most preferred to employ styrene or other vinyl arenes in those compositions which include a liquid monomer.

Other liquid monomers which can be used comprise esters of acrylic acid, methacrylic acid or ethylacrylic acid, e.g., methyl methacrylate, methyl acrylate and neopentyl acrylate, or methacrylate, and esters formed by reacting such acids with polyols, e.g., trimethylolpropane trimethyacrylate and pentaerythritol acrylate. Some of these liquid monomers, e.g., trimethylolpropane trimethacrylate, can also be used as polymerizable plasticizers which decrease the viscosity of the composition but cross-link with themselves, with the diene polymer and/or with other vinyl monomers during heating.

Thickening Agent

The thickening agent is a composition selected from the group consisting of the alkaline earth metal oxides and the alkaline earth metal hydroxides and mixtures thereof, plus the oxides or hydroxides of zinc. Examples of such thickening agents are calcium hydroxide, magnesium oxide, barium hydroxide, and magnesium hydroxide. The preferred thickening agents are magnesium oxide and magnesium hydroxide and mixtures of the two. These compounds are commercially available products. No specific purity is required for the two ingredients, with either the pure ingredients or dispersions thereof being equally suitable, provided no impurities are included which actively interfere with the formation or thickening of the composition of this invention. Thickening agents are necessary in those compositions which require an increase in viscosity before molding. It is possible that these agents can also facilitate the interaction of the adduct with the filler.

Filler

Fillers are preferably included in the composition of this invention to enhance various properties of the moldings such as flexural modulus, strength, hardness, corrosion resistance, electrical properties, flame retardancy and flow, and to lower or reduce less desirable properties such as warpage, shrinkage and composition cost. Examples of suitable fillers are Group IIA metal carbonates, preferably calcium carbonate, talc, mica, clay, wollastonite, aluminum trihydrate and solid or hollow glass beads. Fillers of calcium carbonate are presently preferred because of their interaction with polymer-anhydride adduct. Such fillers can optionally be blended with alumina trihydrate, silica or other fillers known in the art.

Mold Release Agent

The composition of this invention also preferably contains an internal mold release agent to facilitate the removal of the cured composition from the mold. The materials commonly employed for this purpose are metal salts of long chain fatty acids such as zinc stearate and calcium stearate.

Coupling Agent

Additionally, the composition can contain a coupling agent to enhance the properties of molded articles by promoting bonding and adhesion of the polymer to the filler and/or glass fiber reinforcement. The organic silanes and titanates which can be employed as coupling agents in accordance with the present invention include vinyltriethoxysilane, gamma-methacryloxypropyltrimethoxysilane, isopropyl trimethacryl titanate, isopropyl dimethacryl titanate, and the like, and mixtures thereof.

Polymerizable Plasticizer

The composition of this invention can contain polymerizable plasticizers such as the trimethyacrylate of trimethylolpropane, pentaerythritol acrylate, or other high boiling, low volatility, liquid hydrocarbons containing double bonds, which reduce viscosity during compounding but crosslink during curing. Such polymerizable plasticizers can also have the same effects as liquid monomers. These polymerizable plasticizers have the added advantage that they will not be lost by evaporation; thus, the compositions need not be stored in an air tight or sealed container. Although it is possible to use said plasticizers in compositions containing a liquid monomer, it is presently preferred to use said plasticizers or liquid monomers separately. It is presently preferred to use polymerizable plasticizers, comprising polymethacrylates of polyglycols, to minimize viscosity while mixing compositions containing little or no liquid monomer.

Preferred Compositions

The most preferred thermosetting compositions of my invention, having high flexural strength and modulus, high tensile strength, and high impact resistance, will vary depending on the methods of compounding and their end uses but will generally be within the ranges of ingredients stated in the following table:

TABLE I

| Ingredients | Generally Employed Parts by Weight | Preferably Employed Parts by Weight |
| --- | --- | --- |
| High vinyl alkadiene polymer | 100 | 100 |
| Polymer-Anhydride Adduct | 3-30 | 5-18 |
| Liquid monomer | 0-100 | 0-50 |
| Polymerizable plasticizer | 0-10 | 0-6 |
| Filler | 50-1,000 | 300-600 |
| Mold release agent | 0-10 | 2-4 |
| Coupling agent | 0-5 | 0-2 |
| Organic peroxide | 2-10 | 4-6 |
| Thickening agent | 0-5 | 0-2 |
| Fiber reinforcing agent | 0-300 | 80-150 |

The ingredients of the thermosetting compositions of my invention can be mixed by any suitable mixing means such as a Brabender Plasticorder at a relatively low speed for a time sufficient to accomplish complete mixing and wetting of fillers and reinforcing fibers. Preferably the filler is added in two increments at a speed of about 100 r.p.m., whereas the fibers are added thereafter at a much lower speed, e.g., 20 r.p.m., until fully "wet out."

The thermosetting compositions of this invention are molded at an elevated temperature of about 150°–200° C. and a pressure of about 1000 psi, for about 5 minutes.

The following examples are designed to further illustrate the practice of my invention and are not to be considered unduly limitative of the scope of my invention.

EXAMPLE I

In this example the preparation and physical properties of molded thermosetting compositions comprising high-vinyl butadiene plus butadiene-maleic anhydride adducts are described. Said compositions are blended according to Recipe I.

RECIPE I

| Parts by Weight: | Run 1 (Control) | Run 2 (Invention) | Run 3 (Invention) | Run 4 (Control) |
| --- | --- | --- | --- | --- |
| High Vinyl Butadiene,[1] | 100 | 90.0 | 94.8 | — |
| Polymer Adduct,[2] | — | 14.3 | 7.4 | 71.4 |
| Styrene,[3] | 42.9 | 40.6 | 38.6 | 79.4 |
| Calcium Carbonate,[4] | 571.4 | 571.4 | 571.4 | 571.4 |
| Zinc Stearate,[5] | 2.9 | 2.9 | 2.9 | 2.9 |
| Silane Coupling Agent,[6] milliliter | 0.7 | 0.7 | 0.7 | 0.7 |
| Peroxide,[7] | 5.7 | 5.7 | 5.7 | 5.7 |
| Magnesium Oxide,[8] | — | 1.4 | — | 1.4 |
| Magnesium Hydroxide,[9] | — | — | 2.9 | — |
| Fiber Glass[10] | 126.3 | 126.3 | 126.3 | 126.3 |

[1] A liquid polybutadiene produced by Phillips Petroleum Company having a molecular weight Mn of 21,500 and a vinyl content of 56% determined by IR absorption spectroscopy at 11.0 microns, using a solution of approximately 2.5 grams of polymer in 100 milliliters of anhydrous carbon disulfide;
[2] Lithene® PM25MA, a polybutadiene-maleic anhydride adduct, having a bound maleic anhydride content of about 20% by weight, a molecular weight Mn of about 1600, a heterogeneity index Mn/Mn of 7.4, a vinyl content of about 33%, marketed by Lithium Corporation of America, Gastonia, NC;
[3] used as a solvent for polybutadiene, a wetting agent for filler and glass fibers, and a crosslinking agent;
[4] Gamma-Sperse® 6451, a wet ground calcium carbonate, having an average particle size of 5 microns, marketed by Georgia Marble;
[5] Zinc Stearate ABC, a commercial mold release agent, marketed by Synpro;
[6] Silane A174, gamma-methacryloxypropyltrimethoxysilane, marketed by Union Carbide;
[7] Vulcup® R, bis(t-butylperoxyisopropyl)benzene, marketed by Hercules;
[8] Maglite® A, used as a thickening agent, marketed by Merck;
[9] Marinco® H, used as a thickening agent, marketed by C. P. Hall;
[10] Glass 832, ¼ inch chopped glass fiber strands, marketed by Owens Corning.

The compositions of Recipe I were prepared by mixing at room temperature in a CW Brabender Plasticorder having a mixing head fitted with sigma blades. Polymers and 50% of calcium carbonate were added at the initial mixing speed of 100 r.p.m. After 2–3 minutes the remainder of calcium carbonate and all other ingredients were charged, except the magnesium oxide or hydroxide thickening agent, which was added after about 5 minutes. Then the speed was lowered to about 20 r.p.m., and the fiber glass was added and compounded for about 3 minutes.

Molding of the thermosetting compositions was carried out in a Pasadena Press fitted with a polished 6"×6" positive pressure mold for 5 minutes at 163° C., 1100 psi. Molded 6"×6" slabs were sawed into ½" strips for determining mechanical properties.

Pertinent physical properties of molded thermoset compositions of Recipe I are listed in Table II.

TABLE II

| | Run 1[a] (Control) | Run 2 (Invention) | Run 3 (Invention) | Run 4[a] (control) |
| --- | --- | --- | --- | --- |
| Flexural Modulus[b], MPa | 7183 | 13099 | 13849 | |
| Flexural Strength[b], MPa | 67.5 | 93.8 | 93.6 | |
| Tensile Strength at Break[c], MPa | 31.1 | 46.4 | 42.8 | |
| Notched Izod Impact[d], J/M | 192.4 | 245.1 | 184.5 | |
| Barcol Hardness[e] | 45–50 | 60–68 | 60–65 | |

TABLE II-continued

| | Run 1[a] (Control) | Run 2 (Invention) | Run 3 (Invention) | Run 4[g] (control) |
|---|---|---|---|---|
| Shrinkage[f], percent | 0.09 | 0.42 | 0.47 | |

[a]Average of 4 tests
[b]determined according to ASTM D790
[c]determined according to ASTM D638
[d]determined according to ASTM D256
[e]determined according to ASTM D2583, using a GYZG 934-1, Barcol hardness tester manufactured by Barber-Coleman.
[f]determined after 24 hours by measuring the width of the cold molded slab and the width of the cold metal mold, given as the ratio of the width difference divided by the width of the cold mold.
[g]Run 4 (control) - Did not cure well, material was soft, flexible, and tended to come apart.

Data in Table II show that molded compositions containing Lithene PM25MA polybutadiene-maleic anhydride adduct (Run 4) did not cure and were soft and useless. Surprisingly, the addition of said adduct to compositions comprising high-vinyl polybutadiene significantly improved flexural and tensile strength, flexural modulus, impact resistance and hardness, although shrinkage increased by a factor of about 4. However, the amount of shrinkage is not considered excessive for most bulk molding applications.

EXAMPLE II

In this example, the preparation and physical properties of three additional inventive molded thermoset compositions and of one control composition are described. They were blended according to Recipe II.

RECIPE II

| Parts by Weight: | Run 5 (Control) | Run 6 (Invention) | Run 7 (Invention) | Run 8 (Control) |
|---|---|---|---|---|
| High Vinyl Polybutadiene[1], | 100 | 90 | 90 | 80 |
| Polymer Adduct[2], | — | 10 | 10 | 20 |
| Calcium Carbonate[2], | 400 | 400 | 400 | 400 |
| Zinc Stearate[2], | 2 | 2 | 2 | 2 |
| Silane Coupling Agent[2], milliliters | 1.0 | 0.5 | 0.5 | 0.5 |
| Plasticizer[3], | 5 | 5 | 5 | 5 |
| Peroxide[2], | 4 | 4 | 4 | 4 |
| Magnesium Hydroxide[2], | — | 2 | 2 | 2 |
| Water | — | — | 0.5 | 0.5 |
| Fiber Glass[2], | 88 | 88 | 88 | 88 |

[1]A liquid polybutadiene having a molecular weight Mn of about 20,500 and a vinyl content of 68%, produced by Phillips Petroleum Company
[2]See footnotes to Recipe I
[3]Saret® 515, trimethacrylate of trimethylolpropane, a crosslinkable plasticizer, marketed by Sartomer Co.

Physical properties of molded compositions of Recipe II, blended and molded according to the procedures of Example I, are listed in Table III.

TABLE III

| | Run 5 (Control) | Run 6 (Invention) | Run 7 (Invention) | Run 8 (Invention) |
|---|---|---|---|---|
| Flexural Modulus[a], MPa | 7136 | 9495 | 10849 | 10522 |
| Flexural Strength[a], MPa | 76.7 | 80.4 | 98.2 | 89.6 |
| Tensile Strength at Break[a], MPa | 36.9 | 27.7 | 42.7 | 42.0 |
| Notched Izod Impact[a], J/M | 181 | 188 | 186 | 211 |
| Barcol Hardness[a] | 55-60 | 70-74 | 70-75 | 67-72 |
| Shrinkage[a], percent | 0.26 | 0.57 | 0.48 | 0.57 |

[a]See footnotes to Table II

Data in Table III confirm that small amounts of the polybutadiene-maleic anhydride adduct, Lithene PM25MA, improve the flexural strength, impact resistance and hardness of molded compositions comprising high-vinyl polybutadiene. The shrinkage of inventive compositions of Runs 6, 7, 8 is somewhat higher than for the control composition, but is still quite low and acceptable for bulk molding applications.

While this invention has been described in detail for the purpose of illustration, it is not to be construed as limited thereby, but is intended to cover all the changes and modifications within the spirit and scope thereof.

I claim:
1. A composition comprising an admixture of:
   (a) a high vinyl alkadiene polymer, having at least 50 percent of the alkadiene units bonded together in the 1, 2 mode of addition;
   (b) organic peroxide;
   (c) an adduct of an alkadiene polymer with an anhydride of a mono- or dicarboxylic acid, and
   (d) an inorganic filler.
2. A composition comprising an admixture of:
   (a) a high vinyl alkadiene polymer, having at least 50 percent of the alkadiene units bonded together in the 1, 2 mode of addition;
   (b) organic peroxide;
   (c) an adduct of an alkadiene polymer with an anhydride of a mono- or dicarboxylic acid;
   (d) an inorganic filler; and
   (e) a liquid monomer.
3. A composition according to claims 1 or 2, further comprising one or more ingredients selected from the group consisting of:
   (a) mold release agents;
   (b) coupling agents;
   (c) fiber reinforcing agents;
   (d) polymerizable plasticizers,
   (e) thickening agents.
4. A composition according to claims 1 or 2, wherein said high vinyl alkadiene polymer is selected from the group consisting of linear and radially-branched homopolymers of 1,3-alkadienes containing from 4 to about 18 carbon atoms, and the copolymers of such 1,3-alkadienes with substituted or unsubstituted vinyl arene comonomers containing from 8 to about 20 carbon atoms.
5. A composition according to claim 2 wherein said liquid monomer is a vinyl arene.
6. A composition according to claims 1 or 2, wherein said high vinyl alkadiene polymer consists essentially of 1,3-polybutadiene.
7. A composition according to claims 1 or 2 wherein said high vinyl alkadiene polymer comprises at least 60 percent vinyl and weight average molecular weight is in the range of about 1,000 to 50,000.
8. A composition according to claims 1 or 2 wherein said organic peroxide is 2 to 10 parts by weight per 100 parts by weight of the polymer, and is selected from the group consisting of alpha, alpha'-bis(tert-butylperoxy)-diisopropylbenzene, 2,5-dimethyl-2,5-bis(tert-butylperoxy)hexane, 2,5-dimethyl-2,5-bis(tert-butylperoxy)hexyne, and admixtures thereof.
9. A composition according to claims 1 or 2 wherein said adduct is selected from the group consisting of the reaction products of conjugated alkadiene polymers consisting essentially of linear and radially branched homopolymers of 1,3-alkadienes containing from 4 to about 18 carbon atoms, and the copolymers of such 1,3-alkadienes with substituted or unsubstituted vinyl arene comonomers containing from 8 to about 20 car- bon atoms, with maleic anhydride, either unsubstituted or substituted with an alkyl substituent having up to 12 carbon atoms.

10. A composition in accordance with claim 9 wherein said adduct comprises an alkadiene polymer having a vinyl content of at least about 20 percent.

11. A composition according to claim 3 wherein said thickening agent is from 0 to about 5 parts by weight per 100 parts by weight of the polymer and is selected from the group consisting of oxides and hydroxides of magnesium, calcium, strontium, barium and zinc, and mixtures thereof.

12. A composition according to claims 1 or 2 wherein said filler is selected from the group consisting of Group IIA metal carbonates, talc, mica, clay, wollastonite, aluminum trihydrate and solid or hollow glass beads and mixtures thereof.

13. A composition according to claims 1 or 2 wherein said filler comprises a carbonate of a Group IIA metal.

14. A composition according to claims 1 or 2 wherein said filler comprises calcium carbonate in an amount of about 50 to 1000 parts by weight per 100 parts by weight of the polymer.

15. A composition according to claim 3 wherein said mold release agent is selected from the group consisting of the metal salts of long chain fatty acids.

16. A composition according to claim 3 wherein said mold release agent comprises stearates of zinc, aluminum, barium, calcium or magnesium, as 0 to 10 parts by weight per 100 parts by weight of the polymer.

17. A composition according to claim 3 comprising from 0 to 5 parts by weight per 100 parts by weight of the polymer, of a coupling agent selected from the group consisting of organic silanes and titanates, and mixtures thereof.

18. A composition according to claim 17 wherein said coupling agent is gamma-methacryloxypropyltrimethoxysilane.

19. A composition according to claim 3 comprising 0-300 parts by weight per 100 parts by weight of the polymer of chopped fiber glass as a fiber reinforcing agent.

20. A composition according to claim 3 wherein said polymerizable plasticizer is from 0 to about 10 parts by weight per 100 parts by weight of the polymer, and is an ester of acrylic acid, or a substituted acrylic acid, and a polyfunctional alcohol.

21. A composition according to claim 20 wherein said polymerizable plasticizer is the trimethacrylate of trimethylolpropane.

22. A method of forming compositions suitable for preparing reinforced plastic articles comprising mixing together:
(a) an adduct of a vinyl-containing alkadiene polymer with an anhydride of a mono- or dicarboxylic acid; and
(b) an inorganic filler; then adding and mixing ingredients further comprising:
(c) a high vinyl alkadiene polymer, having at least 50 percent of the alkadiene units bonded together in the 1, 2 mode of addition; and
(d) organic peroxide.

23. A method of forming compositions suitable for preparing reinforced plastic articles comprising mixing together:
(a) a high vinyl alkadiene polymer, having at least 50 percent of the alkadiene units bonded together in the 1, 2 mode of addition; and
(b) a portion of inorganic filler; then adding and mixing a remaining portion of said inorganic filler and ingredients further comprising:
(c) an adduct of a vinyl-containing alkadiene polymer with an anhydride of a mono- or dicarboxyalic acid; and
(d) organic peroxide; and finally, adding and mixing
(e) a thickening agent.

* * * * *